United States Patent [19]

Hensler et al.

[11] 4,062,566
[45] Dec. 13, 1977

[54] PASSENGER MOTOR VEHICLE

[75] Inventors: Paul Hensler, Stuttgart; Hermann Burst, Rutesheim, both of Germany

[73] Assignee: Firma Dr. -Ing. H.c.F. Porsche AG, Germany

[21] Appl. No.: 666,420

[22] Filed: Mar. 12, 1976

[30] Foreign Application Priority Data

Mar. 12, 1975 Germany .............................. 2510725

[51] Int. Cl.² .............................................. B60R 21/10
[52] U.S. Cl. .................... 280/751; 296/65 A; 237/216
[58] Field of Search ............... 280/751, 752, 753, 748, 280/730; 297/390, 216, 429, 432; 296/65 A; 180/90

[56] References Cited

U.S. PATENT DOCUMENTS

| 3,262,716 | 7/1966 | Graham | 280/751 |
| 3,669,493 | 6/1972 | Vowles | 297/429 |
| 3,837,670 | 9/1974 | Hilyard | 280/753 |
| 3,945,678 | 3/1976 | Neuman | 297/390 |

Primary Examiner—Joseph F. Peters, Jr.
Assistant Examiner—Michael J. Forman
Attorney, Agent, or Firm—Craig & Antonelli

[57] ABSTRACT

Passenger vehicle apparatus including an adjustably movable passenger seat, a knee support arranged in facing spaced relationship with respect to the passenger seat, and interconnecting linkages interposed between the passenger seat and the knee support for automatically adjustably moving the knee support in response to adjusting movement of the passenger seat.

22 Claims, 2 Drawing Figures

PASSENGER MOTOR VEHICLE

BACKGROUND AND SUMMARY OF THE INVENTION

The invention relates to motor vehicles, especially passenger motor vehicles having an adjustable front seat and a safety device constructed as a knee support arranged below the switchboard or dashboard of the vehicle.

It is known to solidly attach knee supports of the mentioned type to the body structure. The position of the knee support in relation to the seat is considerably changed with adjusting operations of the seat. This results in a condition that the knee support for passengers of variable body size is not automatically in the effective position.

It is the task of the present invention to construct a knee support and a seat in such a way that the described disadvantages are avoided.

According to the invention, the knee support is connected to the seat through a device of such construction, that the knee support is adjustable in dependence on the position of the seat. In preferred embodiments, the knee support is adjustable by means of a swivel bearing. The swivel bearing is arranged in the vicinity of a vehicle floor sheet metal panel. The seat and the knee support are interconnected by a linkage system such that movement of the seat automatically results in movement of the knee support about the swivel bearing. The position of the knee support in relation to the seat is adjustable by means of an adjusting device in particularly preferred embodiments. The adjusting device is assigned to the linkage system interconnecting the seat and knee support. The adjusting travel of the knee support and of the seat are geared (transmitted in a ratio to one another) such that the adjusting travel of the knee support is smaller than the adjusting travel of the seat.

The advantages mainly attained with the invention can be seen therein, that the knee support is adjusted automatically in dependence of the position of the seat whereby the knee support for passengers with varied body sizes is always brought into the most effective position. The knee support is adjustable by means of a swivel bearing which, in a simple manner, is arranged advantageously in thevicinity of the floor plate. A safe transmission of the adjusting travel between seat and knee support is accompliched by means of a linkage system. By means of the adjusting device, the knee support is adjustable relative to the seat according to individual wishes. The transmission of the adjusting travel paths of the knee support and seat makes a good bearing condition possible of the seat and knee support under consideration of authropometric and ergonometric aspects.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINS

FIG. 1 shows a partial schematic side view of a passenger motor vehicle with a knee support and seat arrangement constructed in accordance with the present invention; and FIG. 2 shows the detail X of FIG. 1 in an enlarged scale.

DETAILED DESCRIPTION OF THE DRAWINGS

Figure 1:
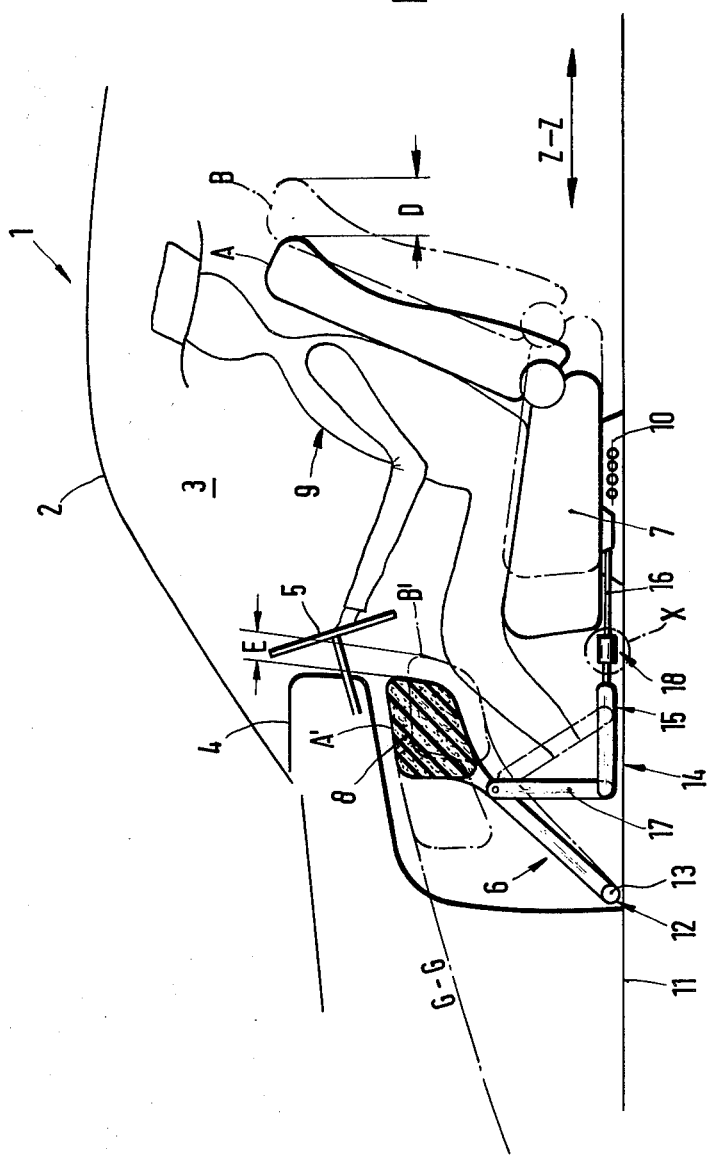
Figure 2:
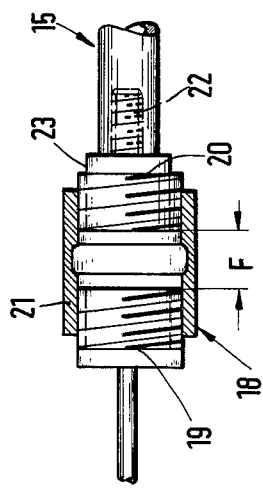

The passenger motor vehicle 1 comprises a body structure 2 including a passenger compartment 3. Inside the passenger compartment 3 are an instrument board or panel 4, a steering wheel 5, a knee support 6 and a seat 7. Seat 7 is adjustable in the vehicle longitudinal direction z —z. The knee support 6 is arranged below the instrument board 4 and is provided with a cushion body 8 which serves for the support of the thigh of a passenger 9 sitting in the seat. An adjusting device 10, known per se and not illustrated in detail, serves for the adjustment of the seat 7 which rests on a floor plate 11.

Seat 7 and the knee support 6, pivoted through swivel bearings at 12 in the vicinity of the floor plate 11, are connected with each other through a linkage device 14. Device 14 is constructed through a linkage 15 which is provided with a member 16 solidly arranged on seat 7 and a toggle joint lever 17.

By the arrangement of the toggle joint lever 17 in the illustrated manner, which, in position A of the seat 7 is directed upwardly and in position B is slanted (dash lines), a transmission of the adjusting travels of the knee support 6 and the seat 7 is obtained (see position A ' and B ' of the knee support 6). The maximum adjustment travel of the seat 7 is the measurement D, whereas the maximum adjustment travel of the knee support 6 is the measurement E which, therefore is smaller than the measurement D. Therefore, the lever ratio is such that the knee support moves a smaller distance than does the passenger seat during adjustment of the passenger seat.

For the accommodation of the position relationship (knee support to seat) other transmission means may be selected, according to other non-illustrated contemplated embodiments of the invention.

In order to change the basic adjustment of the knee support 6 in relation to the seat 7, an adjusting device 18 is provided. The adjusting device 18 is inserted into the part 16 of the linkage 15. It encompasses thread member 19, 20 which cooperate with each other by means of a thread sleeve 21 in such a manner, that the measurement F can be changed whereby the knee support 6 may be moved closer to the seat 7 or further away fron it. For this purpose, the thread member 20 is rotatably arranged at part 15 through a screw connection 22 and is provided with a shoulder 23 for operation with a tool.

The knee support 6 may also be supported in a sliding device in place of the pivoting arrangement according to another preferred embodiment of the invention. It could then be adjustably movable in a plane G —G.

The described knee support may also be provided advantageously in connection with a belt system in a passenger motor vehicle.

While we have shown and described several embodiments in accordance with the present invention, it is understodd that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:
1. Passenger vehicle apparatus comprising:
an adjustable movable passenger seat;

a knee support arranged in facing spaced relationship with respect to said passenger seat, and interconnecting means interposed between said passenger seat and said knee support for automatically adjustably moving said knee support relative to said seat in response to adjusting movement of said passenger seat.

2. Apparatus according to claim 1, wherein said passenger seat is a passenger seat which faces a vehicle instrument board, and wherein said knee support is disposed below said instrument board.

3. Apparatus according to claim 2, wherein said knee support is mounted for pivotal movement with respect to a relatively fixed vehicle body part by way of a swivel bearing.

4. Apparatus according to claim 3, wherein said swivel bearing is arranged in the vicinity of a vehicle floor plate, said floor plate being disposed below said instrument board and said passenger seat.

5. Apparatus according to claim 1, wherein said knee support is mounted for pivotal movement with respect to a relatively fixed vehicle body part by way of a swivel bearing.

6. Apparatus according to claim 5, wherein said fixed vehicle body part is separate from said passenger seat.

7. Apparatus according to claim 5, wherein said swivel bearing is arranged in the vicinity of a vehicle floor plate.

8. Apparatus according to claim 1, wherein said interconnecting means includes a linkage movable with said passenger seat.

9. Apparatus according to claim 1, wherein said interconnecting means includes adjustment means for adjusting the relative position of said passenger seat and knee support with respect to one another.

10. Apparatus according to claim 9, wherein said interconnecting means includes a linkage movable with said passenger seat.

11. Apparatus according to claim 10, wherein said adjustment means is arranged in said linkage.

12. Apparatus according to claim 1, wherein said interconnecting means includes lever means with the relative movement of said passenger seat and knee support being controlled by a lever ratio assuring different movement distances for the passenger seat and knee support.

13. Apparatus according to claim 12, wherein said lever ratio is such that the knee support moves a smaller distance than does said passenger seat during adjustment of the passenger seat.

14. Apparatus according to claim 1, wherein said interconnecting means includes guide means for linearly guiding the travel path of said knee support.

15. Apparatus according to claim 1, wherein said knee support is fixedly connected to one end of a knee support lever, the other end of said knee support lever being pivotally attached to a fixed vehicle body part, and wherein said interconnecting means includes a toggle lever pivotally attached to said knee support lever intermediate the ends thereof.

16. Apparatus according to claim 15, wherein said interconnecting means includes adjustment means for adjusting the relative position of said passenger seat and knee support with respect to one another.

17. Apparatus according to claim 1, wherein a fixed vehicle body part is provided, wherein said interconnecting means includes means for automatically adjustably moving said knee support with respect to both said fixed vehicle body part and said passenger seat in response to adjusting movement of said passenger seat with respect to said fixed vehicle body part, whereby the relative position of said knee support and the passenger seat is automatically adjusted as a function of the passenger seat position.

18. Apparatus according to claim 17, wherein said interconnecting means includes means for automatically moving said knee support with respect to said fixed vehicle part by a smaller distance than said passenger seat is moved with respect to said fixed vehicle part.

19. Apparatus according to claim 17, wherein said interconnecting means includes a knee support lever having one end thereof pivotally connected to said fixed vehicle body part, wherein said knee support is carried at the other end of said knee support lever, and wherein said interconnecting means further includes a toggle lever pivotally attached to said knee support lever intermediate the ends thereof, said toggle lever being also connected to and movable with the passenger seat.

20. Apparatus according to claim 19, wherein said interconnecting means includes means for automatically moving said knee support with respect to said fixed vehicle part by a smaller distance than said passenger seat is moved with respect to said fixed vehicle part.

21. Apparatus according to claim 1, wherein said interconnecting means includes means for automatically adjustably moving said knee support with respect to said passenger seat in response to adjusting movement of said passenger seat, whereby the relative position of said knee support and the passenger seat is automatically adjusted as a function of the position of the passenger seat.

22. Apparatus according to claim 21, wherein said interconnecting means includes means for automatically moving said knee support by a smaller distance than said passenger seat is moved.

* * * * *